(12) United States Patent
Park et al.

(10) Patent No.: US 9,051,982 B2
(45) Date of Patent: Jun. 9, 2015

(54) ELECTRIC CALIPER BRAKE WITH PARKING FUNCTION

(71) Applicant: MANDO CORPORATION, Pyeongtaek-si, Gyeonggi-do (KR)

(72) Inventors: Joong Gwun Park, Yongin-si (KR); Jae Jin Hur, Pyeongtaek-si (KR); Yo Han Kim, Pyeongtaek-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/022,982

(22) Filed: Sep. 10, 2013

(65) Prior Publication Data

US 2014/0069751 A1    Mar. 13, 2014

(30) Foreign Application Priority Data

Sep. 10, 2012  (KR) .................. 10-2012-0099677

(51) Int. Cl.
| | |
|---|---|
| *B60T 13/74* | (2006.01) |
| *F16D 65/18* | (2006.01) |
| *F16D 65/00* | (2006.01) |
| *F16D 121/24* | (2012.01) |
| *F16D 125/40* | (2012.01) |
| *F16D 125/48* | (2012.01) |
| *F16D 127/06* | (2012.01) |

(52) U.S. Cl.
CPC ............ *F16D 65/18* (2013.01); *F16D 65/0075* (2013.01); *F16D 2121/24* (2013.01); *F16D 2125/40* (2013.01); *F16D 2125/48* (2013.01); *F16D 2127/06* (2013.01)

(58) Field of Classification Search
USPC ................. 188/72.4, 72.6–72.9, 156–164
See application file for complete search history.

(56) References Cited

U.S. PATENT DOCUMENTS

| 6,349,801 | B1 * | 2/2002 | Koth et al. ............. 188/72.8 |
| 8,051,957 | B2 * | 11/2011 | Giering et al. ............ 188/72.8 |
| 2008/0283345 | A1 * | 11/2008 | Balz et al. .............. 188/72.6 |
| 2012/0292141 | A1 * | 11/2012 | Takahashi .............. 188/72.3 |

FOREIGN PATENT DOCUMENTS

KR    10-2009-0043187 A    5/2009

* cited by examiner

*Primary Examiner* — Christopher Schwartz
(74) *Attorney, Agent, or Firm* — McDermott Will & Emery LLP

(57) ABSTRACT

Disclosed herein is a electric caliper brake with a parking function. The electric caliper brake includes a caliper submodule to apply pressure to a piston to press the disc by converting rotational motion into rectilinear motion through the received rotation power, an actuator submodule to produce braking force to perform the braking function and parking function, and a self-locking module to transfer the braking force by connecting the caliper submodule to the actuator submodule.

13 Claims, 7 Drawing Sheets ium Patent Application No. 2012-0099677, filed on Sep. 10, 2012 in the Korean Intellectual Property Office, the disclosure of which is incorporated herein by reference.

ELECTRIC CALIPER BRAKE WITH PARKING FUNCTION

CROSS-REFERENCE TO RELATED APPLICATION(S)

This application claims the benefit of Korean Patent Application No. 2012-0099677, filed on Sep. 10, 2012 in the Korean Intellectual Property Office, the disclosure of which is incorporated herein by reference.

BACKGROUND

1. Field

Embodiments of the present invention relate to an electric caliper brake with parking function which produces braking force through an electric actuator and may produce braking force even if power is off.

2. Description of the Related Art

An electric caliper brake generally employs a motor drive unit operated by electricity as a power source of a driving unit to apply supplemental pressure to the disc of a hydraulic disc brake.

Korean Patent Application Publication No. 2011-0057764 discloses an example of the electric caliper brake. According to this document, the electric caliper brake includes a disc to rotate with a wheel of a vehicle, a pair of pad plates disposed on both sides of the disc to apply pressure to the disc, a pressing member (a piston) installed to be movable forward and backward to apply pressure to the pad plates, a motor to produce driving power, a gear assembly to amplify the driving force produced by the motor, and a spindle to transfer rotational power of the motor from the gear assembly to the pressing member.

The electric caliper brake further includes a self-locking structure which maintains braking force even when power is off after braking is completed. Herein, the disclosed self-locking structure is a latch structure provided with a separate electronic component, i.e., a solenoid. In this structure, movement of a gear is restricted when a movement shaft connected to the solenoid is fitted into a locking hole formed in the gear.

However, in the case of the electric caliper brake as above, a separate electronic component (a solenoid) needs to be added to maintain braking force, and the locking function may be performed only when the movement shaft and locking hole configuring the latch structure are accurately aligned.

Moreover, due to the function of adjusting the position of the pressing member (the piston) according to wear of the friction pad contacting the disc other than the braking function, utilization of an installation space according to use of the electronic component (the solenoid), and connection of electric circuits, which are additionally needed, the electric caliper brake as above may be disadvantageous in view of cost and manufacturing.

CITED REFERENCE

Patent Document

Korean Patent Application Publication No. 2011-0057764

SUMMARY

Therefore, it is an aspect of the present invention to provide an electric caliper brake with parking function which realizes a mechanical self-locking structure through a spring, thereby maintain braking force without an additional electrical signal, being easier to install in a vehicle due to the simplified structure, and automatically adjusting the position of a piston according to wear of a friction pad.

Additional aspects of the invention will be set forth in part in the description which follows and, in part, will be obvious from the description, or may be learned by practice of the invention.

In accordance with one aspect of the present invention, a electric caliper brake with a parking function includes a caliper submodule including a pair of pad plates disposed on both sides of a disc to apply pressure to the disc to perform braking, a caliper housing provided with a cylinder having a piston for application of pressure to the pad plates installed therein to be movable forward and backward, and a spindle unit provided with a nut installed through a rear portion of the cylinder to apply pressure to the piston by converting rotational movement into rectilinear movement at the caliper housing 120 to convert rotational motion into rectilinear motion, and a screw couple to the nut, an actuator submodule including a motor to produce braking force to perform a braking function and the parking function, and a gear assembly configured with a plurality of gears to reduce a rotational speed of the motor the motor, and a self-locking module the gear assembly to transfer rotational power by connecting a final output gear of the gears to the screw, wherein the self-locking module includes a first connector installed at a rear portion of the screw to rotate together with the screw, a second connector installed at a center of the final output gear to rotate together with the final output gear, and a torsion spring, one end thereof being connected to the first connector and the other end thereof being connected to the second connector to transfer the rotational power, wherein the torsion spring elastically deformed according to a load from a time point at which the pad plates pressed by the piston begins to contact the disc, to restrict rotation of the disc.

The self-locking module may be disposed in an accommodation portion protruding from the rear portion of the cylinder to have one open side.

The torsion spring may include a body having a coil shape, a first coupling portion curved from one end of the body, and a second coupling portion curved from the other end of the body.

The first connector may be formed in a cylindrical shape, provided at a center thereof with a through hole into which the rear portion of the screw is inserted, and provided with a first coupling groove formed on an outer circumferential surface of the first connector in a longitudinal direction to allow an end of the first coupling portion to be inserted into and supported by the first coupling groove.

The torsion spring may be installed such that an inner circumferential surface of the body of the torsion spring is spaced a certain distance apart from the outer circumferential surface of the first connector, and an outer circumferential surface of the body may be spaced a certain distance apart from an inner circumferential surface of the accommodation portion.

The second connector may include a rod coupled to the center of the final output gear, and a flange radially extending from an end of the rod opposite to the other end coupled to the final output gear, wherein the flange may be provided with a second coupling groove formed by being cut open in a direction toward a center of the flange to have a predetermined length along the outer circumferential surface such that an end of the second coupling portion is inserted into and supported by the second coupling groove.

The first connector may be further provided with a separation prevention bracket installed at a rear portion of the first connector to prevent separation of the torsion spring, wherein the separation prevention bracket may have a diameter corresponding to the body of the torsion spring, and an open-cut portion may be formed on an outer circumferential surface of the separation prevention bracket to allow the second coupling portion of the torsion spring to pass through the separation prevention bracket.

The separation prevention bracket may be coupled to a center of the rear portion of the screw by a bolt coupled to a center of the separation prevention bracket.

When a load is applied, the torsion spring may be elastically deformed by exhibiting a first deformation of increase of a diameter of the body of the torsion spring and a second deformation of decrease of the diameter of the body, the first deformation occurring when the second coupling portion rotates farther than the first coupling portion, and the second deformation occurring when expansion of an outer circumferential surface of the body increasing an outer diameter of the body is forcibly restricted by an inner circumferential surface of the accommodation portion after the first deformation occurs, wherein rotation may be restricted as an inner circumferential surface of the body applies pressure to the first connector by contacting an outer circumferential surface of the first connector after the second deformation.

Centers of the spindle unit, the torsion spring, the second connector and the final output gear are arranged on the same line.

The torsion spring may transfer the rotational power to the screw via the first and second connectors, and automatically adjust a position of the piston, when a friction pad attached to each of the pad plate is worn due to contact between the nut screw-coupled to the screw and the piston, to maintain a constant distance between the disc and the pad plates.

One of the gears of the gear assembly is provided, at a center thereof, with a connection shaft allowing manually rotating the gears from an outside.

The torsion spring may transfer the rotational power in an unloaded state and may not be deformed until the pad plates come into contact with the disc.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
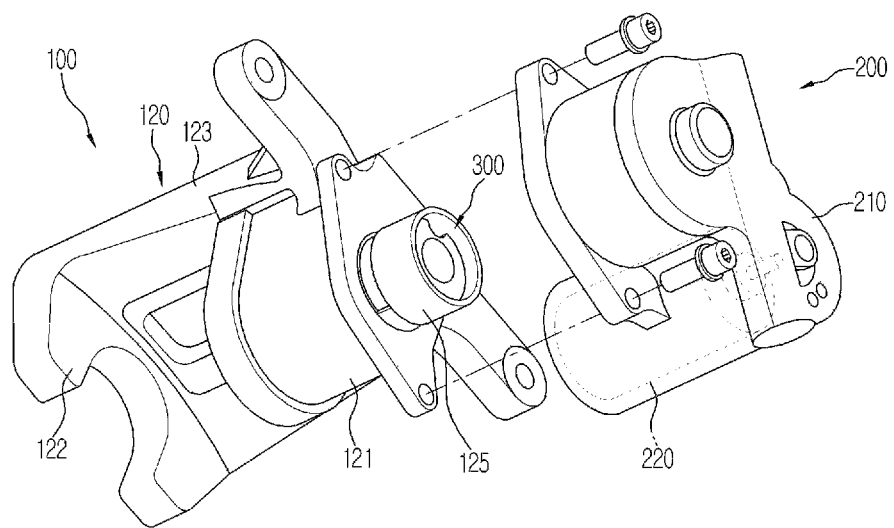
FIG. 1 is an exploded perspective view schematically showing an electric caliper brake with parking function according to an exemplary embodiment of the present invention.

Reference will now be made in detail to the embodiments of the present invention, examples of which are illustrated in the accompanying drawings, wherein like reference numerals refer to like elements throughout.

Figure 2:
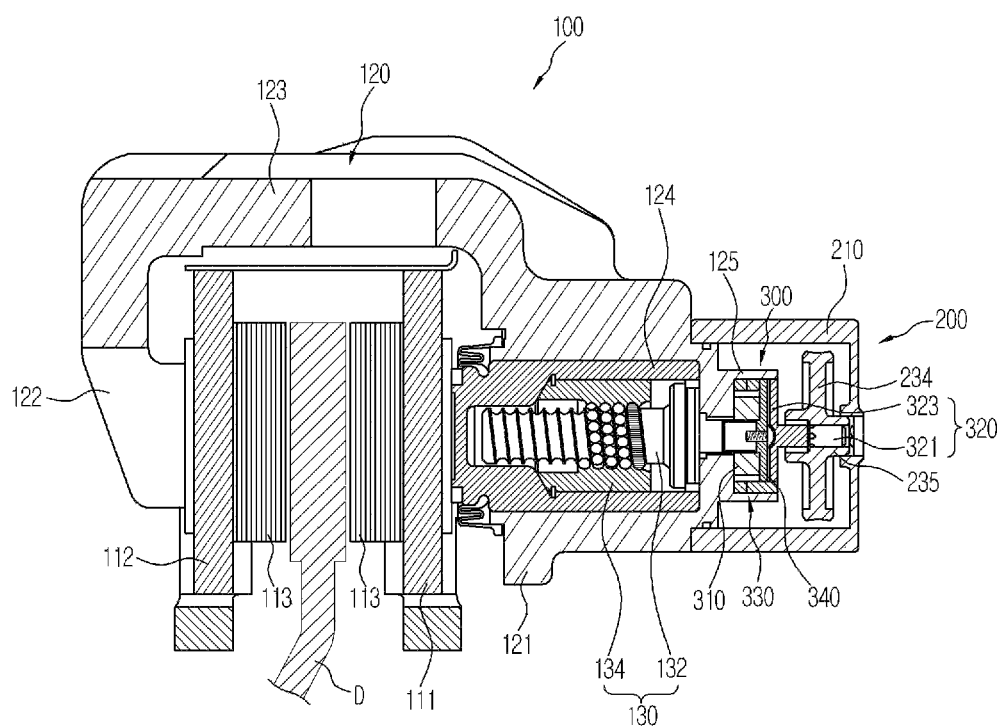
FIG. 2 is a lateral cross-sectional view showing the electric caliper brake of FIG. 1, which is assembled.

FIG. 1 is an exploded perspective view schematically showing an electric caliper brake with parking function according to an exemplary embodiment of the present invention, and FIG. 2 is a lateral cross-sectional view showing the electric caliper brake of FIG. 1, which is assembled.

Referring to FIGS. 1 and 2, the electric caliper brake with parking function includes a caliper submodule 100 to perform a braking function and a parking function, an actuator submodule 200 to produce braking force to perform the braking function and parking function, and a self-locking module 300 to transfer the braking force to the caliper submodule 100 to perform the self-locking function.

The caliper submodule 100 includes a disc D to rotate with a wheel of a vehicle, a pair of pad plates 111 and 112 disposed on both sides of the disc D to apply pressure to both side surfaces of the disc D to perform braking, a caliper housing 120 provided with a cylinder 121 in which a piston 124 to apply pressure to the pad plates 111 and 112 is installed to be movable forward and backward, and a spindle unit 130 installed at the caliper housing 120 to convert rotational motion into rectilinear motion.

The pad plates 111 and 112 are divided into an inner pad plate 111 disposed adjacent to the piston 124, and an outer pad plate 112 disposed adjacent to a finger 122 of the caliper housing, which will be described later. The pad plates 111 and 112 are installed at a carrier (not shown) to be movable forward and backward. The carrier is fixed to a vehicle body to be movable toward or away from both side surfaces of the disc D.

The caliper housing 120 includes a cylinder 121 disposed at the back of the caliper housing 120 and provided with a spindle unit 130 and a piston 124 mounted therein, a finger 122 disposed at the front of the caliper housing 120 and curved downward to operate the outer pad plate 112, and a connection portion 123 to connect the cylinder 121 to the finger 122. The cylinder 121, the finger 122 and the connection portion 123 are integrated with each other.

The spindle unit 130 includes a screw 132 to receive rotational power produced by the actuator submodule 200, which will be described later, and a nut 134 coupled to the screw 132 to rectilinearly move and contacting the piston 124. In this embodiment, the spindle unit 130 includes a ball screw and a ball nut. However, embodiments of the present invention are not limited thereto. A structure to convert rotational motion into rectilinear motion, for example, threads may be formed in the screw and the nut such that the screw is screw-coupled to the nut.

The nut 134 is disposed in the piston 124 to be movable forward and backward in the longitudinal direction of the screw 132 with rotation thereof restricted. The leading end of the nut 134 is arranged in contact with the piston 124. Thereby, when the nut 134 moves according to rotation of the screw 132 and thus applies pressure to the piston 124, the piston 124 in turn applies pressure to the disc D while contacting the inner pad plate 111.

The screw 132 is rotatably installed in the cylinder 121 such that the screw 132 is arranged through the back of the caliper housing 120 in the direction parallel with the direction of forward and backward movement of the nut 134. Herein, the rear portion of the screw 132 may be formed to have a polygonal cross-section to be coupled to a first connector 310, which will be described later, to rotate together with the first connector 310.

Meanwhile, an accommodation portion 125 protrudes from the back of the caliper housing 120 to have one open side. The accommodation portion 125, in which the self-locking module 300, which will be described later, is disposed, is integrated with the caliper housing 120. The rear portion of the screw 132 is positioned at the accommodation portion 125. The accommodation portion 125 is coupled to the housing 210 of the actuator submodule 200 outside of the accommodation portion 125 to support stable coupling between the caliper submodule 100 and the actuator submodule 200. Additionally, while the accommodation portion 125 is illustrated as being integrated with the caliper housing 120, embodiments of the present invention are not limited thereto. The accommodation portion may be coupled to the caliper housing 120 by a separate fastening member (not shown).

The reference numeral '113' represents a friction pad attached to each of the pad plates 111 and 112 facing the disc.

The actuator submodule 200 includes a housing 210 having an accommodation space formed therein, a motor (see 220 in FIG. 1) installed in the housing 210 to produce braking force, and a gear assembly (not shown) configured with a plurality of gears to reduce the rotational speed of the motor 220.

The housing 210 accommodates the motor 220 and the gear assembly and is coupled to the caliper housing 120.

The motor 220 is adapted to perform forward and backward rotation when electric power is applied thereto.

The gear assembly has a structure in which plural gears are engaged with each other. That is, the gear assembly receives rotational power from the rotating shaft of the motor 220 and transfers the received power to a final output gear 234 through a plurality of gears connected to each other. The gear assembly, the structure of which is not shown in detail, may adopt various assembly structures such as a spur gear assembly to be arranged in the housing 210 to receive rotational power from the motor or a worm gear assembly having a worm and a worm wheel coupled to each other. That is, the gear assembly reduces rotational speed through various gear assembly structures, and transfers rotational power to the self-locking module 300 through the final output gear 234.

Meanwhile, according to one embodiment of the present invention, a connection shaft (see '235' in FIG. 2) is provided to one of the gears of the gear assembly to allow the gears to be manually rotated to manually release braking force in the case that the motor 220 does not operate in releasing braking force due to error in an electrical signal. As shown in FIG. 2, the connection shaft 235 is arranged at the center of the final output gear 234 at one side of the final output gear 234 to rotate together with the final output gear 234. The connection shaft 235 may be provided with a hexagonal groove (not shown) formed therein or a hexagonal outer circumferential surface such that the connection shaft 235 is manually rotated using a separate tool, for example, a hexagonal wrench.

Figure 3:
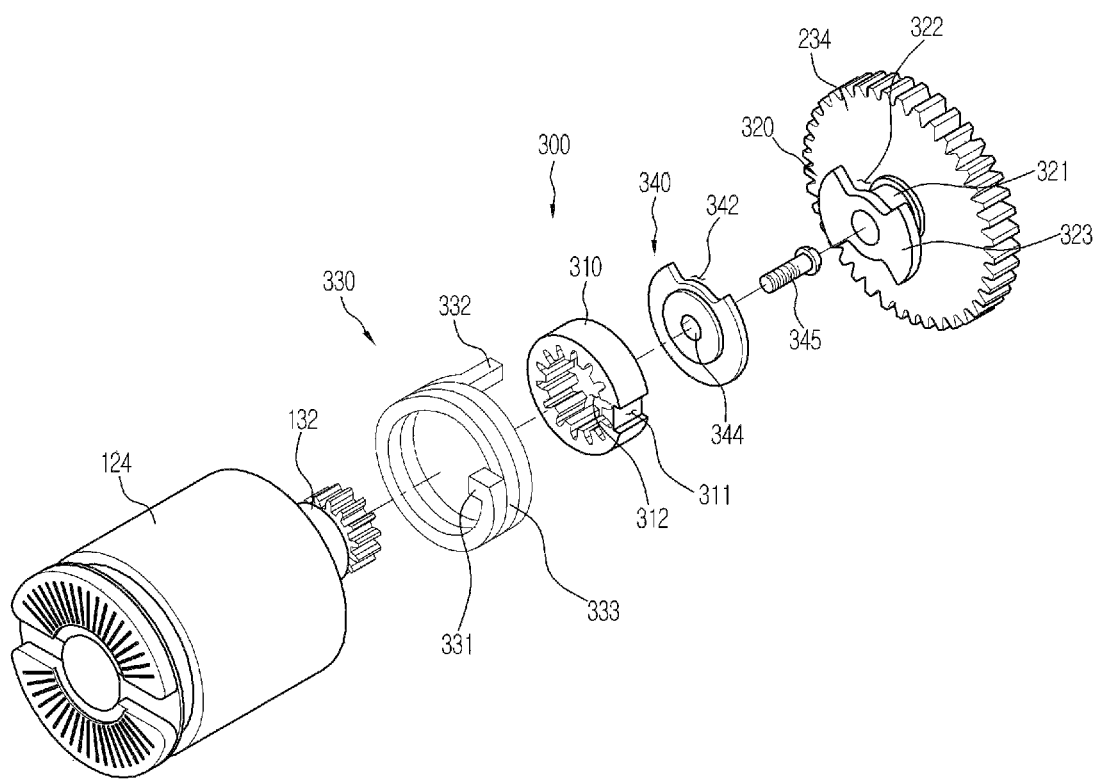
FIG. 3 is an exploded perspective view showing a self-locking module provided to an electric caliper brake with parking function according to one embodiment of the present invention.
Figure 4:
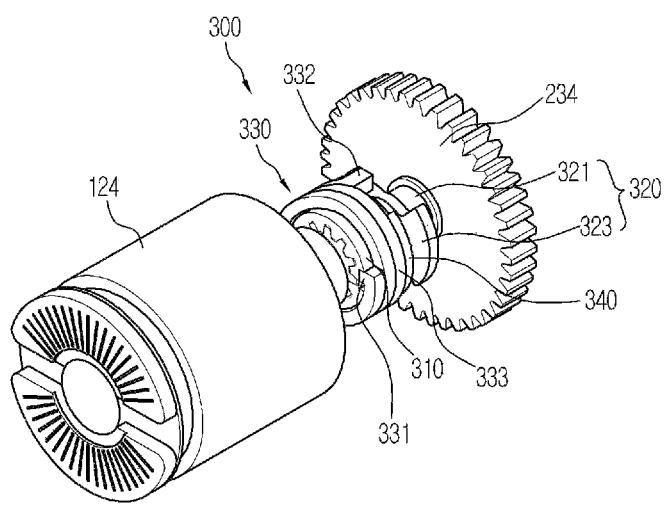
FIG. 4 is a perspective view showing the self-locking module of FIG. 3, which is assembled.

As described above, the self-locking module 300 is disposed in the accommodation portion 125 formed at the back of the cylinder 121 to connect the final output gear 234 to the screw 132 such that rotational power is transferred. More specifically, the self-locking module 300 includes, as shown in FIGS. 3 and 4, a first connector 310 installed at the back of screw 132 to rotate together with the screw 132, a second connector 320 installed at the center of the other side of the final output gear 234 to rotate together with the final output gear 234, and a torsion spring 330 to connect the first connector 310 and the second connector 320 to transfer rotational power. Herein, the torsion spring 330 is adapted to restrict rotation of the disc D by being elastically deformed according to load from the moment the pad plate 111 pressed by the piston 124 begins to contact the disc D. Restriction of rotation by elastic deformation of the torsion spring 330 will be described again later.

The torsion spring 330 includes a body 333 having a coil shape, a first coupling portion 331 curved from one end of the body 333, and a second coupling portion 332 curved from the other end of the body 333. The torsion spring 330 is formed to be elastically deformed outward or inward in the radial direction of the body 333.

The first connector 310 is formed in a cylindrical shape, and is provided at the center thereof with a through hole 312 into which the rear portion of the screw 132 is inserted. Herein, the through hole 312 has a shape corresponding to the cross-sectional shape of the rear portion of the screw 132. That is, as the rear portion of the screw 132 having a polygonal shape is inserted into the through hole 312, the first connector 310 rotates together with the screw 132. The first connector 310 is provided with a first coupling groove 311 formed in a longitudinal direction to allow an end of the first coupling portion 331 of the torsion spring 330 to be inserted into and supported by the outer circumferential surface of the first connector 310 such that rotational power is transferred from the first coupling portion 331 to the first connector 310.

The second connector 320 is provided with a rod 321 coupled to the center of the final output gear 234 and a flange 323 radially extending from the opposite end of the rod 321 coupled to the final output gear 234. The second connector 320 functions to transfer rotational power from the final output gear 234 to the torsion spring 330 by rotating together with the final output gear 234. Thereby, the flange 323 is provided with a second coupling groove 322 cut open in the direction of the center to have a predetermined length along the outer circumferential surface. At least one second coupling groove 322 may be formed along the outer circumferential surface of the flange 323. An end of the second coupling portion 332 is inserted into and supported by the second coupling groove 322. As shown in FIGS. 3 and 4, the second coupling portion 332 contacts one side end of the second coupling groove 322 having a predetermined length to be supported by the second coupling groove 322. Thereby, a gap (see 'G' in FIG. 5) having a predetermined length is formed between the second coupling portion 332 and the other side end of the second coupling groove 322.

Figure 5:
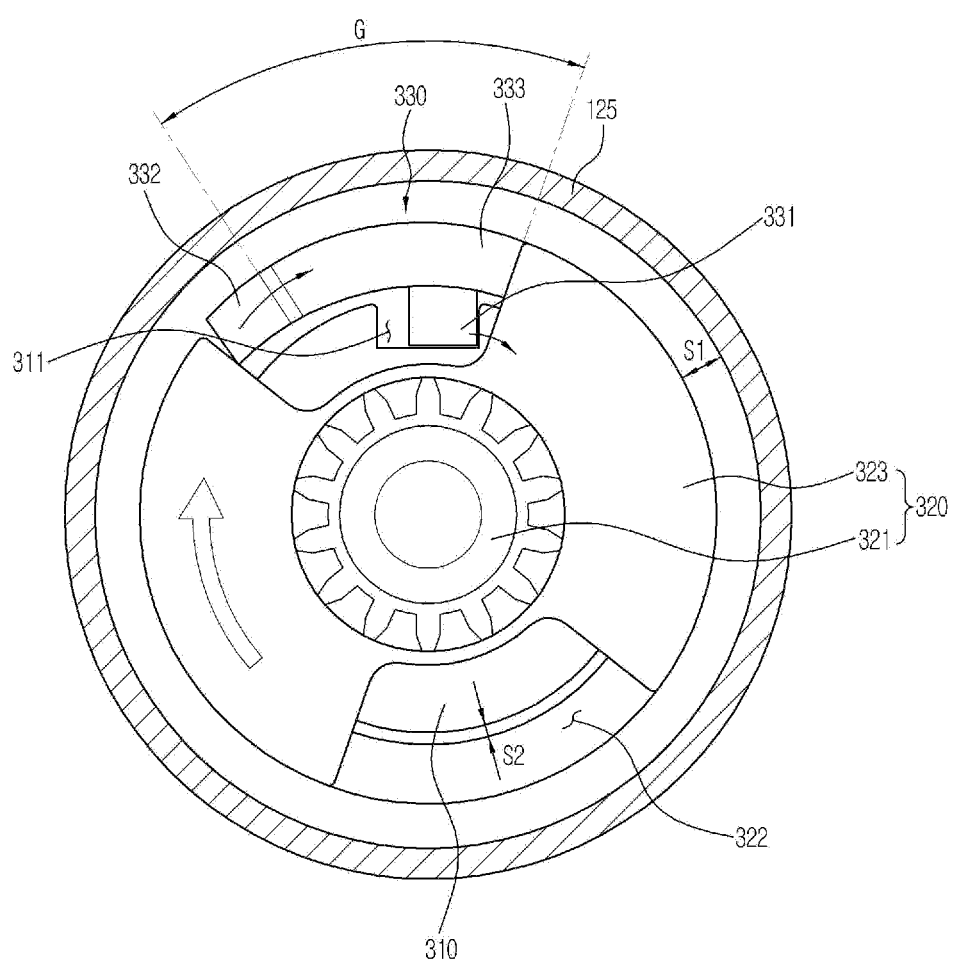
FIGS. 5 to 7 are views illustrating the mechanical self-locking operation performed by elastic deformation of a torsion spring of a self-locking module according to an embodiment of the present invention.

When the self-locking module 300 is installed, the inner circumferential surface of the body 333 of the torsion spring 330 is spaced a distance S2 apart from the outer circumferential surface of the first connector 310, and the outer circumferential surface of the body 333 is spaced a distance S1 apart from the inner circumferential surface of the accommodation portion 125 (see FIG. 5).

Meanwhile, the self-locking module 300 further includes a separation prevention bracket 340 disposed at the rear portion of the first connector 310 to prevent separation of the torsion spring 330. The separation prevention bracket 340 has a diameter corresponding to that of the body 333 of the torsion spring 330. An open-cut portion 342 may be formed on the outer circumferential surface of the separation prevention bracket 340 to allow the second coupling portion 332 of the torsion spring 330 to pass through the separation prevention bracket 340. The separation prevention bracket 340 is provided at the center thereof with a coupling hole 344. Thereby, the separation prevention bracket 340 is coupled to the center of the rear portion of the screw 132 by a bolt 345 to rotate together with the first connector 310 and the screw 132.

The screw 132, the torsion spring 330, the second connector 320 and the final output gear 234 are disposed in series and the centers thereof are arranged on the same line. Thereby, the torsion spring 330 transfers rotational power produced by the actuator submodule 200 to the caliper submodule 100. In addition, the torsion spring 330 transfers the rotational power to the screw 132 via the first and second connectors 310 and 320. In addition, as the friction pad 113 attached to the pad plate 111 wears down due to contact between the nut 134 screw-coupled to the screw 132 and the piston 124, the torsion spring 330 automatically adjusts the position of the piston 124 to maintain a constant distance between the disc D and the pad plates 111 and 112. That is, in the case that braking force is released after braking is completed according to the gap G formed between the second coupling groove 322 formed in the second connector 320 and the second coupling portion 332 of the torsion spring 330, when the second connector 320 rotates by a distance corresponding to the gap G in the opposite direction, the other side end of the second coupling groove 322 contacts the second coupling portion 332 to transfer rotational power to the torsion spring 330. At this time, since the piston 124 is arranged to be kept in contact with the nut 134, the second connector 320 is rotated before braking to cause the one side end of the second coupling groove 322 to contact the second coupling portion 332 such that the piston 124 and the nut 134 are moved by a distance corresponding to the amount of wear of the friction pad to maintain the constant distance between the disc D and the pad plate 111.

Hereinafter, the self-locking operation of the electric caliper brake with parking function configured as above will be described with reference to FIGS. 5 to 7.

Referring to FIG. 5, the self-locking module 300 is disposed and installed in the accommodation portion 125. The torsion spring 330 is coupled to the first connector 310 installed at the screw 132 (see FIG. 3) and the second connector 320 installed at the final output gear 234 (see FIG. 3). That is, the first coupling portion 331 of the torsion spring 330 is fitted into the first coupling groove 311, the second coupling portion 332 is fitted into the second coupling groove 322. In coupling the torsion spring 330, the torsion spring 330 may be easily connected in an unloaded state due to the gap G formed in the second coupling groove 322.

Once the self-locking module 300 is installed, the outer circumferential surface of the body 333 is spaced a certain distance 51 apart from the inner circumferential surface of the accommodation portion 125, while the inner circumferential surface of the body 333 is spaced a certain distance S2 apart from the outer circumferential surface of the first connector 310. In this state, when braking force is produced by the actuator submodule 200 and thus rotational power is transferred to the torsion spring 330 via the second connector 320 coupled to the final output gear 234, the torsion spring 330 transfers the rotational power to the first connector 310. Thereby, the first connector 310 rotates together with the screw 132 (see FIG. 3). Therefore, the nut 134 rectilinearly moves according to rotation of the screw 132, pushing the piston 124 to cause the pad plate 111 to move toward the disc D (see FIG. 2).

Herein, the torsion spring 330 is not deformed by transferring rotational power in no load state until the pad plate 111 comes into contact with the disc D.

Figure 6:
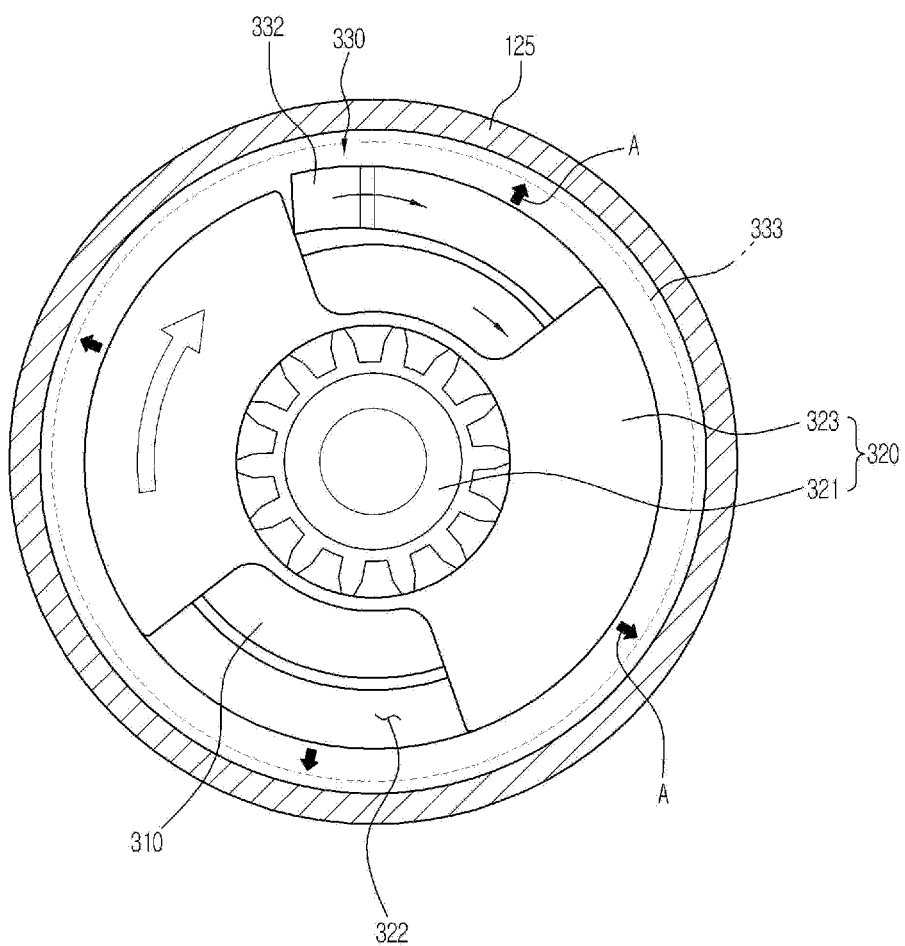

Next, referring to FIG. 6, which indicates the time at which initial braking force is produced as the pad plate ('111' in FIG. 2) comes into contact with the disc ('D' in FIG. 2) according to forward movement of the piston ('124' in FIG. 2), reaction force produced by contact between the pad plate 111 and the disc D is transferred to the spindle unit 130 and the self-locking module 300 via the piston 124. Thereby, load is produced and torsional force is produced in the torsion spring 330. That is, as rotation of the screw 132 and the first connector 310 is restricted, a first deformation of the torsion spring 330 is caused in the direction indicated by arrow A in which the diameter of the body 333 extends by the rotational power transferred from the second connector 320. In this deformation, the torsion spring 330 is elastically deformed by the tendency of the second coupling portion 332 of the torsion spring 330 to rotate farther than the first coupling portion 331. Herein, the dotted line in FIG. 6 represents expansion of the body 333 of the torsion spring 330.

During the first deformation of the torsion spring 330, increase of the diameter of the outer circumferential surface of the body 333 is restricted by the inner circumferential surface of the accommodation portion 125.

Figure 7:
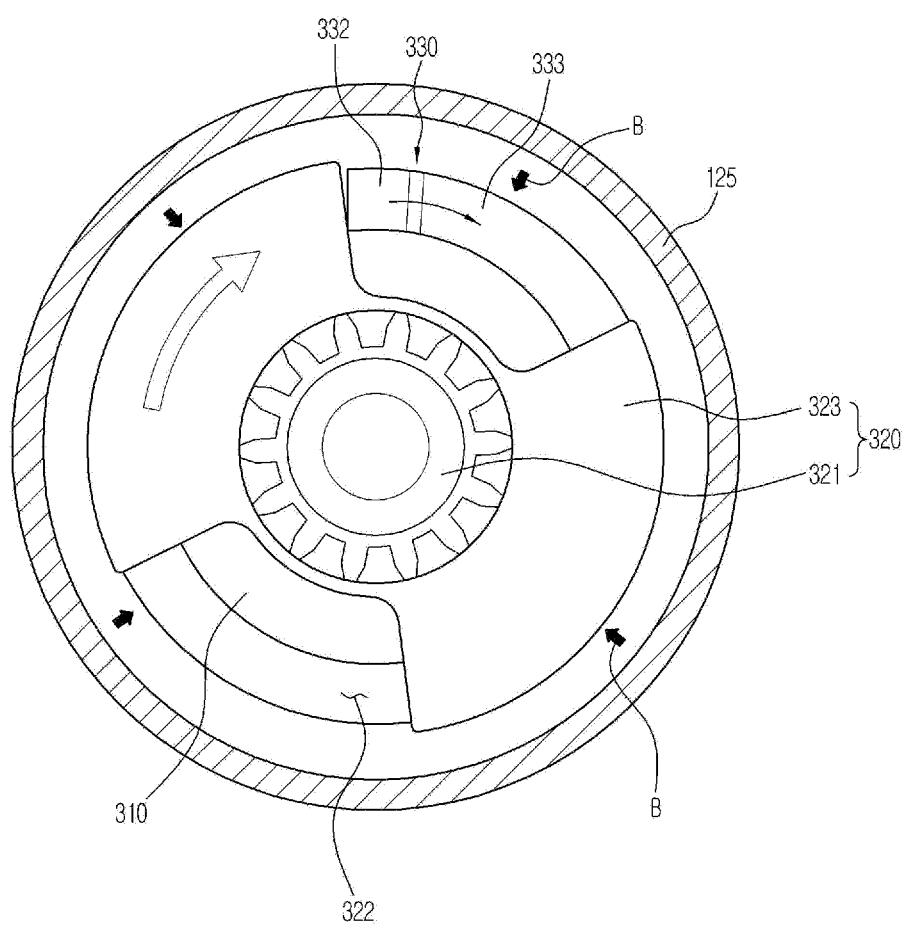

Finally, referring to FIG. 7, which shows the self-locking function according to a second deformation of the torsion spring 330 caused by application of load, as the extension of the diameter of the body 333 is restricted by the inner diameter of the accommodation portion 125 after the first deformation, a second deformation of reduction in diameter of the body 333 occurs in the direction indicated by the arrow B. That is, the body 333 is elastically deformed such that the inner circumferential surface of the body 333 contacts and presses the outer circumferential surface of the first connector 310, and thus rotation is restricted. At this time, electricity applied to the motor ('220' in FIG. 1) is cut off, rotation of the first connector 310 is restricted according to change in the inner and outer diameters of the torsion spring 330, and thus the self-locking (parking) function is performed.

In releasing braking force, rotational power is produced by the actuator submodule 200 in the opposite direction of the rotational power produced in braking. Thereby, the final output gear 234 rotates in the opposite direction, and the torsion spring 330 and the first connector 310 receiving the rotational power from the second connector 320 rotates in the opposite direction of rotation in braking, and thus self-locking is released. At this time, as the second connector 320 rotates by the gap (see 'G' in FIG. 5) formed between the second coupling groove 322 and the second coupling portion 332 of the body 333, the other side end of the second coupling groove 322 comes into contact with the second coupling portion 332 such that the rotational power according to release of braking is transferred. After braking is released, the second connector 320 rotates in the direction of producing braking force such that the one side end of the second coupling groove 322 comes into contact with the second coupling portion 332. During these operations, the nut 134 coupled to the screw 132 is kept in contact with the piston 124. Thereby, even if the friction pad 113 attached to the pad plates 111 and 124 is worn out, the position of the piston 124 is automatically adjusted such that a constant distance between the disc D and the pad plate 111 and 124 may be maintained (see FIG. 2).

Meanwhile, in the case that the motor 220 does not operate due to errors in an electrical signal after braking is completed, braking force may be released by manually rotating the connection shaft (see '235' in FIG. 2) formed at the final output gear 234 so as to be reachable from the outside.

Consequently, an electric caliper brake with parking function according to one embodiment of the present invention performs self-locking with the torsion spring 330 to park a vehicle with large force. In addition, operating shock occurring during operation of electric caliper brake may be absorbed by the torsion spring 330. Moreover, a braking function may be more stably implemented by the mechanical locking structure than by a conventional electric locking structure. In addition, the electric caliper brake is provided with a simple structure, and therefore may be advantageous in view of manufacture and cost. Furthermore, the self-locking module 300 may be provided as a separate unit, and thus it may be applied to various parking devices having different structures by simply altering the torsion spring 330 to produce parking force required for each type of vehicle.

As is apparent from the above description, an electric caliper brake with parking function according to one embodiment of the present invention may mechanically perform the self-locking (parking) function in a manner that rotational motion is restricted by deformation of a torsion spring expanding and contracting as load is produced from the moment the pad plate contacts the disc. That is, mechanical self-locking is performed without any electrical signal other than the electrical signal to apply electricity to the motor.

In addition, as the friction pad attached to the pad plate wears down, the torsion spring automatically adjusts the position of the piston to maintain a constant distance between the disc and the pad plate. Thereby, the configuration of the electric caliper brake is more simplified than in conventional cases, and the electric caliper brake may be more advantageous in view of manufacturing and cost.

Moreover, even if the motor does not operate due to errors in an electrical signal during release of braking force, braking force may be manually released.

Meanwhile, the self-locking module provided to an electric caliper brake with parking function according to an embodiment of the present invention may be provided as a separate unit, and therefore torsion springs producing different torsional spring force may be employed depending on the types of vehicles. Thereby, the self-locking module may be easily handled.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electric caliper brake with a parking function comprising:
   a caliper submodule comprising a pair of pad plates disposed on both sides of a disc to apply pressure to the disc to perform braking, a caliper housing provided with a cylinder having a piston for application of pressure to the pad plates installed therein to be movable forward and backward, and a spindle unit provided with a nut installed through a rear portion of the cylinder to apply pressure to the piston by converting rotational movement into rectilinear movement at the caliper housing to convert rotational motion into rectilinear motion, and a screw coupled to the nut;
   an actuator submodule comprising a motor to produce a braking force to perform a braking function and the parking function, and a gear assembly configured with a plurality of gears to reduce a rotational speed of the motor; and
   a self-locking module to transfer a rotational power by connecting a final output gear of the gears to the screw, wherein the self-locking module comprises:
   a first connector installed at a rear portion of the screw to rotate together with the screw;
   a second connector installed at a center of the final output gear to rotate together with the final output gear; and
   a torsion spring, one end thereof being connected to the first connector and another end thereof being connected to the second connector to transfer the rotational power,
   wherein the torsion spring elastically deforms according to a load from a time point at which the pad plates pressed by the piston begins to contact the disc, to restrict rotation of the disc.

2. The electric caliper brake according to claim 1, wherein the self-locking module is disposed inside an accommodation portion which protrudes from the rear portion of the cylinder and which has one side of the accommodation portion open to accommodate the self-locking module.

3. The electric caliper brake according to claim 2, wherein the torsion spring comprises:
   a body having a coil shape;
   a first coupling portion curved from one end of the body; and
   a second coupling portion curved from another end of the body.

4. The electric caliper brake according to claim 3, wherein the first connector is formed in a cylindrical shape, provided at a center thereof with a through hole into which the rear portion of the screw is inserted, and provided with a first coupling groove formed on an outer circumferential surface of the first connector in a longitudinal direction to allow an end of the first coupling portion to be inserted into and supported by the first coupling groove.

5. The electric caliper brake according to claim 4, wherein the torsion spring is installed such that an inner circumferential surface of the body of the torsion spring is spaced a certain distance apart from the outer circumferential surface of the first connector, and an outer circumferential surface of the body is spaced a certain distance apart from an inner circumferential surface of the accommodation portion.

6. The electric caliper brake according to claim 3, wherein the second connector comprises:
   a rod coupled to the center of the final output gear; and
   a flange radially extending from an end of the rod opposite to another end coupled to the final output gear,
   wherein the flange is provided with a second coupling groove formed by being cut and open in a direction toward a center of the flange to have a predetermined length along an outer circumferential surface of the flange such that an end of the second coupling portion is inserted into and supported by the second coupling groove.

7. The electric caliper brake according to claim 3, wherein the first connector is further provided with a separation prevention bracket installed at a rear portion of the first connector to prevent separation of the torsion spring,
   wherein the separation prevention bracket has a diameter corresponding to the body of the torsion spring, and an open-cut portion is formed on an outer circumferential surface of the separation prevention bracket to allow the second coupling portion of the torsion spring to pass through the separation prevention bracket.

8. The electric caliper brake according to claim 7, wherein the separation prevention bracket is coupled to a center of the rear portion of the screw by a bolt coupled to a center of the separation prevention bracket.

9. The electric caliper brake according to claim 3, wherein, when the load is applied, the torsion spring is elastically deformed by exhibiting a first deformation of increase of a diameter of the body of the torsion spring and a second deformation of decrease of the diameter of the body, the first deformation occurring when the second coupling portion rotates farther than the first coupling portion, and the second deformation occurring when expansion of an outer circumferential surface of the body increasing an outer diameter of the body is forcibly restricted by an inner circumferential surface of the accommodation portion after the first deformation occurs, wherein rotation is restricted as an inner circumferential surface of the body applies pressure to the first connector by contacting an outer circumferential surface of the first connector after the second deformation.

10. The electric caliper brake according to claim 1, wherein centers of the spindle unit, the torsion spring, the second connector and the final output gear are arranged on the same line.

11. The electric caliper brake according to claim 1, wherein the torsion spring transfers the rotational power to the screw via the first and second connectors, and automatically adjusts a position of the piston, when a friction pad attached to each of the pad plate is worn due to contact between the nut screw-coupled to the screw and the piston, to maintain a constant distance between the disc and the pad plates.

12. The electric caliper brake according to claim 1, wherein one of the plurality of gears has a connection shaft at a center thereof allowing external manual rotation of the gears.

13. The electric caliper brake according to claim 1, wherein the torsion spring transfers the rotational power in an unloaded state and is not deformed until the pad plates come into contact with the disc.

* * * * *